Patented May 19, 1936

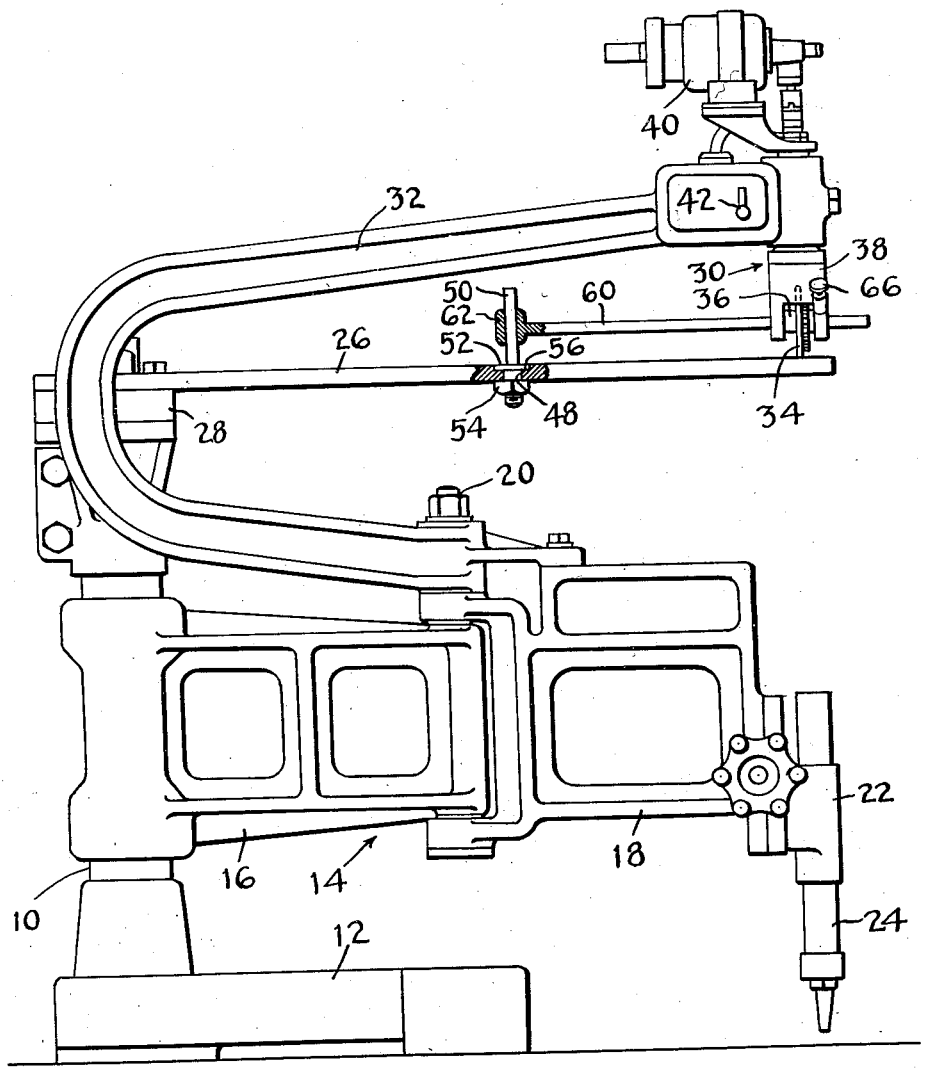

2,040,914

UNITED STATES PATENT OFFICE 2,040,914

UNIVERSAL TORCH MACHINE

James L. Anderson, Closter, N. J., assignor to Air Reduction Company, Incorporated, New York, N. Y., a corporation of New York Application October 26, 1933, Serial No. 695,315

9 Claims. (Cl. 266—23)

This invention relates to torch cutting or welding machines, and particularly to machines of the type in which a torch is supported for universal movement in a plane and a tracer is connected with the torch support in such relation that the torch is moved along a path similar to that followed by the tracer.

In such machines the tracer wheel is swivelly connected with the upper part of the tracer and runs on a supporting table. The tracer is manually guided along the outline of a drawing or other pattern placed on the table. This guiding requires substantially the full attention of the operator, and the accuracy with which the torch reproduces the outline of the pattern depends to a large extent on the ability of the operator to accurately guide the tracer.

When cutting or welding along a circular path a radius arm can be used to guide the tracer. Such mechanical guiding results in accurate movement of the tracer and torch along the circular path, and the attention of an operator is required only when starting and stopping the cutting or welding operation.

It is an object of this invention to provide improved mechanical tracer guiding means which are reliable and inexpensive, can be quickly and conveniently placed in operation on a universal torch machine for guiding the tracer along circular paths, and which are readily detachable whenever the tracer is to be manually guided along a non-circular path.

Other objects, features and advantages of the invention will appear or be pointed out as the description proceeds.

The drawing shows a side elevation, partly in section, of a universal cutting or welding machine embodying the invention.

The machine includes a column 10 extending upward from a base 12. A jointed arm 14 has links 16 and 18 which are pivotally connected with one another by a bolt 20. The link 16 pivots on the column 10, and the link 18 supports a torch holder 22 for universal movement in a plane. A cutting or welding torch 24 is carried by the torch holder.

A drawing or pattern table 26 has a bracket 28 connecting it with the upper end of the column 10. A tracer 30 runs on the table 26 and is connected to a deep throated arm 32 which extends around the edge of the table 26 and is rigidly fastened to the link 18 to move as a unit with this link. The arm 32 is of such length and shape that the tracer is located immediately above the torch holder with the point of contact of the tracer wheel 34 on the table 26 directly above the tip of the torch 24.

The tracer wheel has a hollow axle 36 carried by the swivel portion 38 of the tracer. The wheel 36 is driven from a motor 40 through suitable reduction gearing. A switch 42 controls the supply of power to the motor.

When the machine is used to cut or weld along a non-circular outline, a drawing or other pattern to be followed is placed on the table and the tracer wheel 34 is steered manually by turning the swivel portion 38 to cause the tracer wheel to follow the outline of the drawing or other pattern. The arm 32 and jointed arm 14 comprise a frame to which both the torch holder 22 and tracer 30 are connected in such relation that the movement of the tracer along any path on the table 26 causes the torch holder 22 and torch 24 to move along a similar path.

There is an opening 48 through the table 26, and this opening is preferably located near the center of the table. A center post 50 has a collar 52 intermediate its ends. The lower end of the center post 50 fits the opening 48 and extends slightly below the bottom face of the table. A nut 54 threads on the lower end of the center post, and this nut abuts against the bottom face of the table to clamp the center post rigidly to the table.

If the opening 48 is of uniform diameter, the collar 52 is clamped against the top face of the table 26. The diameter of the opening 48 is preferably made large enough at the upper end to receive the collar 52. The diameter of the opening 48 changes abruptly to form a shoulder 56 against which the collar 52 is clamped by the nut 54.

A radius arm 60 has a hub 62 which fits over the upper end of the center post. This hub rotates freely on the center post and its bearing on the center post is long enough so that when the outer end of the arm 60 moves up and down the hub 62 moves axially along the center post without binding.

The radius arm 60 extends through the hollow axle 36 of the tracer. The center post 50 and radius arm 60 constitute a circle cutting attachment for the universal cutting machine. The tracer can be shifted along the radius arm 60 until the distance of the tracer wheel 34 from the axis of the center post 50 is equal to the radius of the circle which is to be cut. The tracer is then secured to the radius arm by means of a set-screw 66, which extends through the hollow axle of the tracer and contacts with the radius arm.

The tracer 30 has a limited vertical movement in the arm 32 so that it is free to "float" if the surface of the table or pattern is rough or undulating.

The center post 50 is readily detachable from the table 26 by removing the nut 54 and lifting the post out of the opening 26. The connection of the tracer to the radius arm 60 is released by loosening the set-screw 66. When the tracer is manually guided, its path sometimes crosses the opening 48, but the diameter of this opening is small compared with the diameter of the tracer wheel and the opening causes no substantial interruption therefore in the uniform rate of travel of the tracer. The opening 48 can be closed, if desired, by a plug which is similar to the center post 50 except that it does not extend above the upper face of the collar 52.

The invention has been illustrated on a universal torch machine of the single jointed-arm type in which the tracer is in line with the torch, but the invention can be applied to any type of universal torch machine having a tracer and pattern table.

The connection of the center post to the table can be modified, and other changes can be made in the machine illustrated without departing from the invention as defined in the claims.

I claim:

1. A cutting or welding machine comprising a frame supporting a torch holder for universal movement in a plane, a tracer including a swivel portion and a traction wheel carried by the swivel portion in such position that the point of traction of the driving wheel is in line with the axis of rotation of said swivel portion, means connecting the tracer with the frame in such relation to the torch holder that said torch holder moves in a path similar to that of the traction wheel in any and changing directions in a plane, a supporting table on which the tracer runs, a post connected with the table and extending upward from the table, and a radius member, extending around the outside of the post as a bearing, and connecting the tracer with the center post to cause the tracer to follow a circular course.

2. In a universal torch machine, a supporting frame; a tracer connected with the frame for universal movement in a plane, and for floating movement with respect to the frame and normal to the plane of universal movement; a torch holder connected with the frame in such relation to the tracer that the torch moves along a path similar to that followed by the tracer; a table for supporting a pattern or drawing over which the tracer is manually guided when following a non-circular outline; a center post secured to the table; and a rigid radius member rotatable and axially movable on the center post and adapted to be connected to the tracer when the tracer is to follow a circular path.

3. In a universal cutting or welding machine, a pattern or drawing table, a supporting frame for connecting a torch and tracer for movement over similar courses, a tracer connected to the frame and comprising a lower swivel portion having a traction wheel adapted to run on the drawing or pattern along a path similar to that followed by the torch, a bearing affording the traction wheel and connected parts of the tracer movement toward and from the table so that the wheel can follow undulations or irregularities in the surface on which it runs and can be moved into and out of contact with a pattern or drawing on the table, means on the swivel portion of the tracer for connecting it with a radius rod, a center post detachably fastened to the table and extending above the table for a distance substantially greater than the height of the radius rod connecting means on the tracer, and a radius rod adapted to be connected with the swivel portion of the tracer, and having a bearing surrounding the center post, said bearing being of sufficient length to slide axially on the center post when the tracer wheel travels over undulations or moves toward and from the table.

4. A universal cutting or welding machine comprising a supporting frame; a torch holder and a tracer connected to the frame for movement over similar paths, said tracer including a wheel on a hollow axle; a drawing or pattern table on which the tracer wheel runs; and means for guiding the tracer in a circular path, including a radius arm extending through the hollow axle of the tracer, detachable means fastening the tracer to the radius arm, a center post to which the radius arm is rotatably connected, and detachable means securing the center post to the table.

5. The combination with a universal cutting or welding machine having a tracer including a wheel which is movable in any and changing directions in a plane and causes a torch to execute movements along a path similar to that followed by said wheel, and a pattern or drawing table on which the tracer runs; of a post adapted to extend through an opening in the table; a collar between the ends of the post, said collar being of larger size than the opening through the table; screw threads on the lower end of the post for clamping the collar against the table to hold the post in a stationary upright position; and an arm for connecting the post with the tracer, said arm including a bearing surrounding the post.

6. In a universal torch machine having a floating tracer for guiding the movement of a torch, a pattern or drawing table in which is an opening; a post with a collar intermediate its ends, the end of the post below the collar being of a size to fit the opening in the table and having screw threads; a nut threading over the lower end of the post below the table and abutting the bottom side of the table to clamp the collar against the shoulder; and a radius arm for connecting the tracer to the post, the end of said arm fitting around the upper end of the post as a bearing and having a length of bearing surface sufficient to prevent binding when the arm is moved axially on the post by up and down movement of the tracer.

7. The combination with a universal cutting or welding machine having a floating tracer for guiding a torch, and a pattern or drawing table on which the tracer runs; of a center post having a collar intermediate its ends, the lower end of the post extending through an opening in the table and the collar fitting into an enlarged upper end of the opening with its bottom face abutting a shoulder in said opening through the table; a nut threading on the lower end of the post below the table to clamp the collar against said shoulder and hold the post upright; and a radius arm for connecting the tracer with the center post, one end of the radius arm having a bearing surrounding the post and having rotary and axial movement on the post during the operation of the tracer.

8. A universal cutting or welding machine comprising a base; a jointed arm pivotally connected with the base; a torch holder supported by the jointed arm for universal movement in a plane; a floating tracer connected with the arm and having a swivel portion at its lower end and a driving wheel carried by the swivel portion with its point of traction located in alignment with the torch holder so that the tracer and torch holder follow similar paths; a table on which the tracer operates; and means for guiding the tracer around a circular path comprising a center post detachably fastened to the plate, and a radius arm connected to the swivel portion of the tracer and connected with the center post, said arm having a bearing rotatably and axially movable on the post in response to the translatory and floating movements of the tracer.

9. In a universal torch machine, a center post having a shoulder for contact with a pattern table, and screw threads below the shoulder for clamping the center post securely to the pattern table, a radius arm for connecting a tracer with the center post, said radius arm including a long bearing on the center post extending for a substantial distance above that portion of the radius arm which connects with the tracer and adapted to slide up and down on the center post in response to floating movement of the tracer.

JAMES L. ANDERSON.